United States Patent [19]

Kon

[11] Patent Number: 4,627,660
[45] Date of Patent: Dec. 9, 1986

[54] BUTTON FOR AN AUTOMOTIVE SEAT

[75] Inventor: Shigeki Kon, Akishima, Japan

[73] Assignee: Tachikawa Spring Co. Ltd., Tokyo, Japan

[21] Appl. No.: 833,603

[22] Filed: Feb. 27, 1986

[30] Foreign Application Priority Data

Feb. 28, 1985 [JP] Japan .............................. 60-28333[U]

[51] Int. Cl.$^4$ ............................................. A47C 27/00
[52] U.S. Cl. ........................................ 297/219; 5/471; 5/472; 156/219; 156/220; 297/452; 297/DIG. 2
[58] Field of Search ............... 156/219, 222, 273, 220; 29/91; 28/147; 428/156, 170, 171, 172; 5/472, 471, 401; 297/452, 219, DIG. 2

[56] References Cited

U.S. PATENT DOCUMENTS

| | | | |
|---|---|---|---|
| 3,107,190 | 10/1963 | Kevelin | 156/219 |
| 4,514,869 | 5/1985 | Aoki et al. | 5/472 |
| 4,534,595 | 8/1985 | Abe et al. | 5/471 |
| 4,541,885 | 9/1985 | Caudill, Jr. | 156/220 |
| 4,563,785 | 1/1986 | Samelson | 5/471 |

OTHER PUBLICATIONS

Japanese Laid-Open Publication No. 56-64358 and the English Translation thereof.

Primary Examiner—James T. McCall
Attorney, Agent, or Firm—Cushman, Darby & Cushman

[57] ABSTRACT

A decorative button for use in the surface of an automotive seat and method for making same are disclosed. In the method, a button core member is set on the back side of a trim cover assembly comprising a top cover member, a wadding and a wadding cover, and the button core member is covered by a reinforcing member. The peripheries of the button core member are then pressed and heated to weld the top cover member, wadding, wadding cover and reinforcing member around the button core member to one another into an integral body and, at the same time, to form a deep-valley-shaped recessed portion in the surface of the top cover member around the button core member.

4 Claims, 7 Drawing Figures

BUTTON FOR AN AUTOMOTIVE SEAT

BACKGROUND OF THE INVENTION

1. Field of the Invention

The present invention relates to decorative buttons to be provided in the surface of an automotive seat and, more particularly, to decorative buttons to be provided in the surface of a trim cover assembly which forms a part of an automotive seat and comprises a lamination of a top cover member, a wadding and a wadding cover.

2. Description of the Prior Art

A conventional automotive seat is provided with a plurality of decorative buttons which are designated by (12) (12)—in FIG. 1. Each of such conventional decorative buttons (12)(12)—is constructed in the manner shown in FIG. 2. In particular, each button (12) is produced in the following manner: a button core member (1) is inserted between a top cover member (2) and a wadding (3) formed of foam material; and then, the peripheral portions of the core member (1) are pressed and heated in a round manner by means of high frequency welding together with a reinforcing member (5) to be welded integrally with the surrounding members, with a deep-valley-shaped recess (6) being formed in the surface of the top cover member (2).

In FIG. 3, there is illustrated a method for manufacturing the above-mentioned buttons. That is, the top cover member (2), button core member (1), wadding (3), wadding cover (4) and reinforcing member (5) are sequentially placed on one another, and then they are pressed against one another and heated by means of a high frequency welder lower mold (7) and an upper electrode (8) to be integrally welded to one another. The welder lower mold (7) is formed at its top end with a recessed portion (9) having an inside diameter substantially equal to the outside diameter of the button core member (1). In FIG. 3, (10) designates a circular peripheral portion for welding.

In this way, the welder lower mold (7) cooperates with the upper electrode (8) to weld the top cover member (2), wadding (3), wadding cover (4) and reinforcing member (5) into one united body along the periphery of the button core member (1) and at the same time to form a deep-valley-shaped recess (10) in the surface of the top cover member (2) along the periphery of the button core member (1) so that the button (12) is formed by the portion enclosed by this recess (Japanese Patent Publication No. 48207 of 1982).

FIG. 4 illustrates another conventional example in which a button core member (1) is formed with an integral hook portion (1a). In this case, a wadding (3), a wadding cover (4), a reinforcing member (5) and an upper electrode (8) are respectively formed with through-bores (3a), (4a), (5a), (8a) through which the above-mentioned hook portion (1a) can be passed.

However, in the former prior art wherein the button core member (1) is interposed between the top cover member (2) and wadding (3) and a configuration formed by such core member (1) is enveloped by the top cover member (2) so as to produce the decorative button, the rigidity of the button core member (1) can not be absorbed by the top cover member (2) only. Therefore, when touched, the thus-formed decorative button provides a harder touch over the remaining portions of the top cover member (2) to produce a strange feeling.

Also, in the latter conventional case wherein the button core member (1) is provided with the hook portion (1a), there is a trouble of forming the bores (3a), (4a), (5a) in the wadding (3), wadding cover (4) and reinforcing member (5), respectively.

In addition, in both of the above-mentioned prior art decorative buttons, since the button core member (1) is first placed on the top cover member (2) and then the wadding (3), wadding cover (4) and reinforcing member (5) are to be put on one another sequentially, there is a possibility of the button core member (1) being out of position. And, because the button core member (1) is hard to see, the positioning of the welder lower mold (7) and upper electrode (8) is difficult when they are used for application of pressure and heating.

SUMMARY OF THE INVENTION

The present invention aims at eliminating the drawbacks found in the above-mentioned conventional decorative buttons, which include the hard touch of the decorative buttons, the poor operationability due to the required operaitons for forming bores in the associated parts in case when a button core member with hook is employed, the easily occuring slippage of position of the buttons, the hard positioning of the welder lower mold and upper electrode during the time of pressurization and heating, and so on.

Accordingly, it is a parimary object of the invention to provide a button which can be produced by means of improved order of placement of the button core member and also which is improved in operationability.

In order to accomplish the above object, according to the invention, the button core member is located on the side of a wadding cover of a trim cover assembly which comprises a top cover member, a wadding and the wadding cover; the button core member is covered with a reinforcing member; and, the peripheries of the button core member are pressurized and heated to weld the respective portions of the top cover member, wadding, wadding cover and reinforcing member, which are located around the button core member, to one another into a united body as well as to produce a deep-valley-shaped recess in the surface of the top cover member which is also situated around the button core member.

While each of the above-mentioned prior art decorative buttons is covered with only top cover member of the trim cover assembly, the present invention is characterized in that all of the three components of the trim cover assembly, namely, the top cover member, wadding and wadding cover are placed over the surface of the button core member and that only the reinforcing member is secured to the back surface of the button core member.

In other words, in the conventional seat decorative buttons, since the surface of the button core member is covered with only the top cover member, the rigidity of the core member cannot be absorbed to provide such hard touch as mentioned above. In contrast to this, according to the invention, the surface of the button core member is covered with the top cover member as well as the wadding and the wadding cover to increase the thickness of the covering surface for the button core member. This thickened covering surface is able to absorb the rigidity of the button core member sufficiently to provide a soft touch of the button core member which can match to the soft touch of the remaining portions of the seat. According to the present method, even in case when a hook is provided in the button core member, there is no need for operation to form bores in the wadding and wadding cover of the trim cover assembly, which facilitates the operation of producing the buttons.

Also, in the present method, since after the top cover member, wadding and wadding cover are laid the button core member is placed, there is eliminated the possibility of the button core member being out of position and it is easy to find the position of the button core member so as to be able to enhance the operationability such as an easy pressurizing and heating treatment.

The above and other objects and features of the invention will be apparent from a reading of the following detailed description in connection with the accompanying drawings.

DETAILED DESCRIPTION OF PREFERRED EMBODIMENTS OF THE INVENTION

Figure 5:
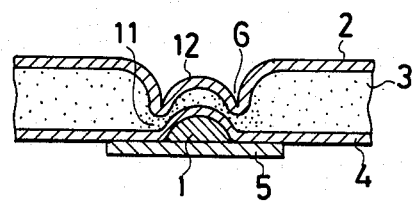
FIG. 5 is a section view of an embodiment according to the invention.

Referring now to FIG. 5, there is shown a section view of a first embodiment of the invention. In FIG. 5, (1) designates a button core member. The top or upper surface of the button core member (1) is covered by a wadding cover (4), a wadding (3) and a top cover member (2) in this order, while the bottom or lower surface of the button core member (1) is supported or covered by a reinforcing member (5).

The wadding (3), wadding cover (4) and reinforcing member (5) are integrally welded to the periphery of the button core member (1) to form a united body, while in the periphery of the button core member (1) the top cover member (2) is formed in its top surface with a deep-valley-shaped recessed portion (6). The portion that is enclosed by the recessed portion (6) is not welded so that a soft and puffy button (12) is formed. Thus, the button (12) may have the same soft touch as the remaining surface portions of the top cover member (2).

Figure 6:
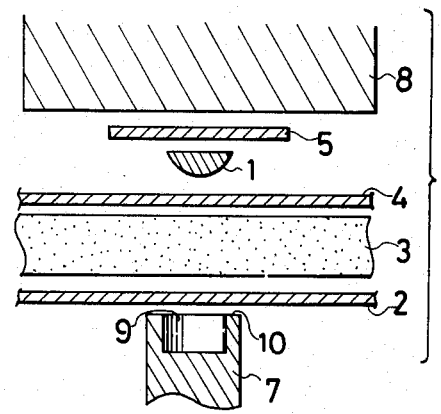
FIG. 6 is a section view to illustrate a method for manufacturing the above embodiment of the invention; and, FIG. 7 is a section view to illustrate another method for manufacturing another embodiment of the invention.

To manufacture the above decorative button, as shown in FIG. 6, in an ascending scale the top cover member (2), wadding (3) and wadding cover (4) are piled up on another, then the button cover member (1) is placed upside down, and the reinforcing member (5) is finally put. This order is selected for manufacturing reasons, although it is reverse to the state of usual use of the top cover member. That is, when it is actually used, the product may be turned over to its normal use position. Now, after piled up on one another in this way, the required components are pressed and heated from below by a welder mold (7) and from above an upper electrode (8). The welder mold (7) is formed at its tip end with a recessed portion (9) to provide a projecting outer periphery (10). Therefore, due to the above-mentioned pressurization and heating the outer periphery (10) is allowed to form the recessed portion (6) in FIG. 5. That is, the tip end recessed portion (9) of the welder mold (7) is formed as an escape for the button (12) including the button core member (1) during such formation.

Figure 1:
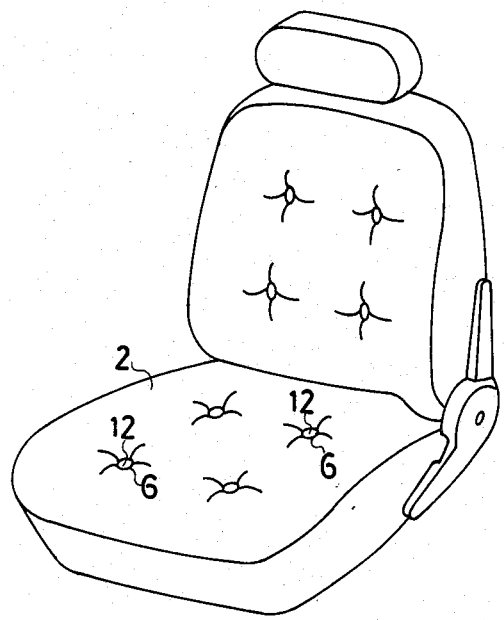
FIG. 1 is a perspective view of an automotive seat provided with decorative buttons.
Figure 2:
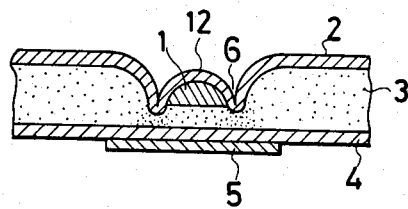
FIG. 2 is a section view of a conventional seat and its decorative button.
Figure 3:
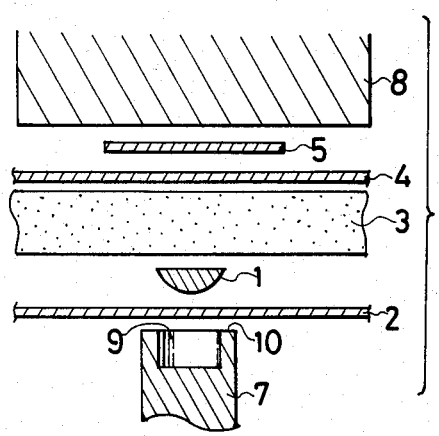
FIG. 3 is a section view to illustrate a conventional method for manufacturing a conventional decorative button.
Figure 4:
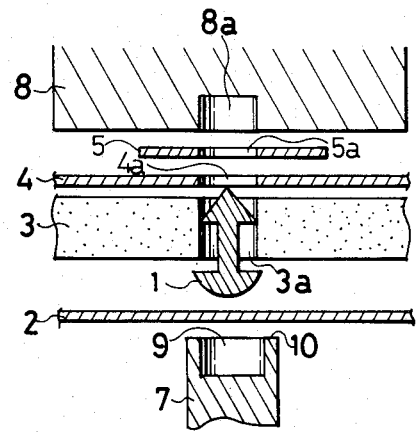
FIG. 4 is a section view to illustrate another conventional method for manufacturing another type of decorative button.
Figure 7:
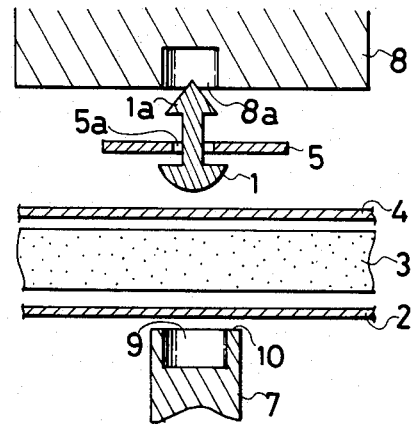

Referring now to FIG. 7, there is illustrated another method for manufacturing a second embodiment of the invention. In this embodiment, since the button core member (1) is provided with a hook (1a), the reinforcing member (5) and upper electrode (8) are formed with bores (5a), (8a), respectively. However, in this embodiment, the relationship between the button core member (1) and the components of the trim cover assembly (or, (2), (3), (4)) is absolutely the same with thee first embodiment of the invention and thus the second embodiment can also be manufactured in an easy manner, while it eliminates the need for formation of the bores (3a, 4a) in the wedding (3) and wadding cover (4) as in the conventional method shown in FIG. 4.

As described hereinbefore, according to the invention, the button is manufactured by covering the button core member with the top cover member, wadding and wadding cover, so that the button of the invention can have a much softer touch over the prior art in which the button core member is covered with only the top cover member.

Also, according to the invention, even in case when the button core member is provided with a hook, there is no need for any bores in the wadding and wadding cover, which permits an easy button manufacturing operation.

In addition, since the button core member is set after the components of the trim cover assembly are set, the button core member is prevented from being out of position and is easy to see, so that the button core member can be positioned easily.

What is claimed is:

1. A button for use in an automotive seat, comprising:
   a trim cover assembly comprising a lamination of a top cover member, a wadding of foam material and a wadding cover,
   a button core member disposed on the side of said wadding cover of said trim cover assembly,
   a reinforcing member for fixing said button core member to said trim cover assembly, and,
   a recessed portion formed on the side of said top cover member of said trim cover assembly by pressing and heating said trim cover assembly and said reinforcing member around said button core member for integral welding thereof.

2. A method of manufacturing a button for use in an automotive seat, comprising the steps of: placing a trim cover assembly comprising a top cover member, a wadding and a wadding cover above a button core member and a reinforcing member onto the bottom surface of said button core member; and, pressing and heating said top cover member, wadding, wadding cover and reinforcing member around said button core member to be welded to one another into an integral body.

3. The method as defined in claim 2, characterized in that there is employed a welder lower mold which is provided with an annular peripheral portion for welding having an inside diameter substantially equal to the outside diameter of said button core member, that said trim cover assembly is put on said annular peripheral portion of said welder lower mold and said button core member and reinforcing member are then placed on said trim cover assembly, and that said trim cover assembly, button core member and reinforcing member are pressed and heated by a welder upper mold to be welded integrally to one another so as to form said button.

4. The button for use in an automotive seat, wherein said button core member is provided with an integral hook.

* * * * *